(12) United States Patent
De Freitas

(10) Patent No.: US 8,382,213 B2
(45) Date of Patent: Feb. 26, 2013

(54) WHEEL HUB ASSEMBLY

(75) Inventor: Oswaldo De Freitas, Oakland Township, MI (US)

(73) Assignee: Meritor Heavy Vehicle Systems Cameri SpA, Cameri (IT)

( * ) Notice: Subject to any disclaimer, the term of this patent is extended or adjusted under 35 U.S.C. 154(b) by 1139 days.

(21) Appl. No.: 12/101,456

(22) Filed: Apr. 11, 2008

(65) Prior Publication Data
US 2008/0211294 A1    Sep. 4, 2008

Related U.S. Application Data

(63) Continuation of application No. 10/505,040, filed on Aug. 18, 2004, now Pat. No. 7,413,261.

(30) Foreign Application Priority Data

Feb. 20, 2002   (GB) .................................. 0203940.2

(51) Int. Cl.
B60B 27/02    (2006.01)

(52) U.S. Cl. 301/105.1; 301/6.8; 301/137; 188/218 XL; 384/544

(58) Field of Classification Search ............... 301/105.1, 301/124.1, 137, 6.8; 188/218 XL; 384/544
See application file for complete search history.

(56) References Cited

U.S. PATENT DOCUMENTS

| | | | |
|---|---|---|---|
| 1,382,881 A | 6/1921 | Ash | |
| 1,473,140 A | 11/1923 | Church | |
| 1,816,643 A * | 7/1931 | Forsyth | 301/63.109 |
| 2,095,054 A * | 10/1937 | Burger | 301/6.1 |
| 2,251,539 A * | 8/1941 | Ash | 188/18 A |
| 2,254,198 A * | 9/1941 | Ash | 301/5.1 |
| 2,343,129 A * | 2/1944 | Ash | 301/36.1 |
| 2,532,605 A | 12/1950 | Castleberry | |
| 3,009,742 A * | 11/1961 | Rabe et al. | 301/35.627 |
| 3,156,566 A | 11/1964 | Williams | |
| 3,525,421 A | 8/1970 | Van Sickle et al. | |
| 3,977,741 A | 8/1976 | Lundberg | |
| 4,811,992 A | 3/1989 | Steiner | |
| 5,174,839 A * | 12/1992 | Schultz et al. | 152/415 |
| 5,205,380 A * | 4/1993 | Paquet et al. | 188/18 A |
| 5,540,303 A | 7/1996 | Bodin et al. | |
| 5,772,285 A * | 6/1998 | Bigley et al. | 301/6.8 |
| 5,988,324 A | 11/1999 | Bertetti et al. | |
| 5,992,943 A * | 11/1999 | Sheets et al. | 301/105.1 |
| 6,102,489 A | 8/2000 | Boese et al. | |
| 6,139,115 A | 10/2000 | Hsieh | |
| 6,145,632 A | 11/2000 | Rutter | |
| 6,224,266 B1 | 5/2001 | Ohtsuki et al. | |
| 6,357,925 B2 * | 3/2002 | Tajima et al. | 384/544 |

(Continued)

FOREIGN PATENT DOCUMENTS

| CH | 675856 | 11/1990 |
|---|---|---|
| CN | 1161285 | 10/1997 |

(Continued)

OTHER PUBLICATIONS

International Search Report mailed Jun. 16, 2003.

*Primary Examiner* — Jason Bellinger
(74) *Attorney, Agent, or Firm* — Carlson, Gaskey & Olds, PC

(57) ABSTRACT

A wheel hub assembly is fitted to a vehicle axle via a wheel bearing mounted on the axle. The assembly includes a hub mountable on the wheel bearing and rotatable relative to the vehicle axle and fastening members to releasably secure the hub relative to the wheel bearing. The hub can be removed without removing the wheel bearing.

12 Claims, 3 Drawing Sheets

U.S. PATENT DOCUMENTS

| | | |
|---|---|---|
| 6,564,912 B1 | 5/2003 | Koschinat |
| 6,889,802 B2 * | 5/2005 | Hamperl ............ 188/218 XL |
| 2003/0111893 A1 | 6/2003 | Hamperi |
| 2004/0207249 A1 | 10/2004 | Baumgartner et al. |

FOREIGN PATENT DOCUMENTS

| | | |
|---|---|---|
| DE | 3823442 | 2/1990 |
| DE | 4101224 | 7/1991 |
| DE | 4412307 | 10/1995 |
| EP | 0418532 | 3/1991 |
| EP | 0687826 | 12/1995 |
| EP | 1070603 | 1/2001 |
| GB | 2117459 | 10/1983 |
| JP | 2001-99172 | 4/2001 |
| WO | 99/31397 | 6/1999 |
| WO | 00/66907 | 11/2000 |
| WO | 01/98681 | 12/2001 |
| WO | 02/102607 | 12/2002 |

\* cited by examiner

WHEEL HUB ASSEMBLY

REFERENCE TO RELATED APPLICATIONS

This application a continuation of U.S. patent application Ser. No. 10/505,040 filed Aug. 18, 2004 now U.S. Pat. No. 7,413,261 which claims priority to National Stage of PCT application PCT/EP03/01640 filed on Feb. 19, 2003, which claims priority to Great Britain patent application GB 0203940.2 filed Feb. 20, 2002.

BACKGROUND OF THE INVENTION

Known hub assemblies for vehicles, particularly large commercial vehicles, include a bearing having a split inner race mounted on a vehicle axle with a hub for mounting a vehicle wheel mounted to the outer race of the bearing. A lip on the hub positioned inboard of the bearing prevents the hub from being removed in an outboard direction without the bearing being simultaneously removed.

Hub removal may be necessary, for example, to replace a worn brake disc mounted inboard of the hub. Removing the bearing requires a relatively high disassembly time. Since split-race bearings are usually used, the most significant time overhead occurs during re-assembly because it is necessary to apply an accurate, predetermined amount of compressive force between the two inner races. If an antilock braking system (ABS) sensor is provided on the bearing, the disassembly and re-assembly procedure is further complicated.

The present invention seeks to overcome, or at least mitigate, the problems of the prior art.

SUMMARY OF THE INVENTION

The present invention provides a wheel hub assembly for fitment to a vehicle axle via a wheel bearing mounted on the axle. The assembly includes a hub mountable on the wheel bearing and rotatable relative to the axle and fastening members to releasably secure the hub relative to the wheel bearing. The assembly is arranged such that the hub is capable of being removed without removing the wheel bearing.

These and other features of the present invention will be best understood from the following specification and drawings.

BRIEF DESCRIPTION OF THE DRAWINGS

Embodiments of the invention will now be described, by way of example only, with reference with the accompanying drawings in which.

DETAILED DESCRIPTION OF THE PREFERRED EMBODIMENT

As used throughout, the terms "inboard" and "outboard" denote the relative positions of components along axis A-A of the hub assemblies with respect to a vehicle on which the assembly is mounted. The terms "inner" and "outer" are used to denote the relative radial inner and outer positions of components transverse to axis A-A.

Figure 1:
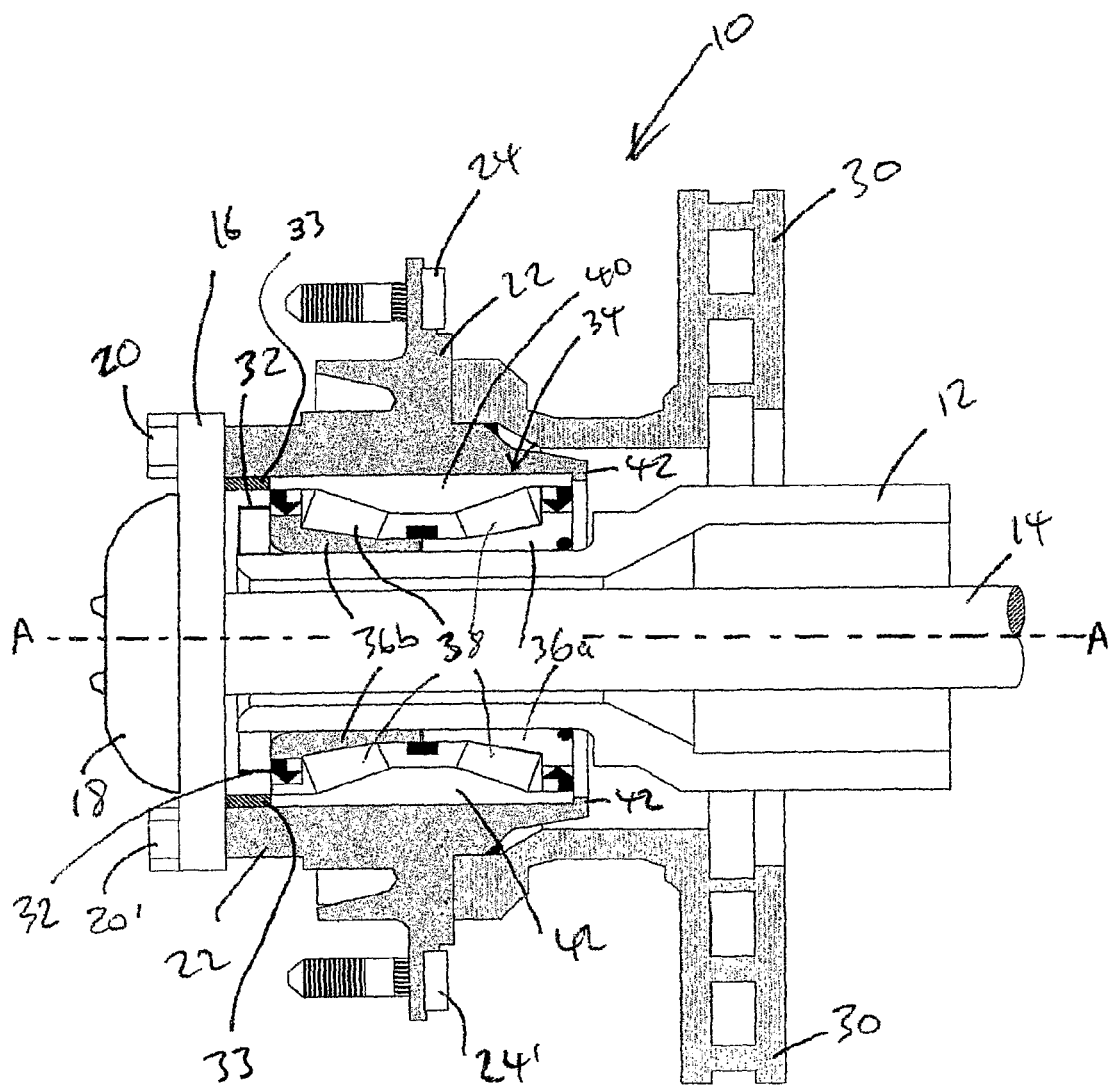
FIG. 1 is a cross-sectional view through the axis of rotation of a prior art axle and hub assembly.

FIG. 1 shows a prior art wheel hub assembly 10 mounted on an axle 12 of a vehicle. A drive shaft 14 rotatable about an axis A-A is drivingly connected to the wheel hub assembly 10 via a drive shaft end plate 16 rotationally and axially fast with the drive shaft 14 and by fastening members, such as bolts 20 and 20', as is well known. Typically, a cap 18 covers the end of the drive shaft 14 to protect from the ingress of dust and the like. Certain voids within the wheel hub assembly 10 are packed with grease for lubrication. The bolts 20 and 20' screw directly into bores provided in the outboard end of a hub 22 of the wheel hub assembly 10. The hub 22 also rotates about the axis A-A and is provided with an annular surface to which a vehicle wheel may be secured using wheel studs 24 and 24'. A brake disc 30, which is part of a disc brake mechanism (not shown), is non-rotatably mounted relative to the hub 22 by a bolted connection.

Certain voids within the assembly 10 are packed with grease for lubrication. Bolts 20, 20' screw directly into bores provided in the outboard end of a hub 22 of the hub assembly 10. The hub also rotates about axis A-A and is provided with an annular surface to which a vehicle wheel may be secured using wheel studs 24, 24'. A brake disc 30, which is part of a disc brake mechanism (not shown), is non-rotably mounted relative to the hub 22 by a bolted connection.

The weight of the vehicle is transmitted from the axle 12 to the hub 22 and the wheel via a rotating element taper roller bearing 34 mounted towards the outboard end of the axle 12. The rotating element taper rolling bearing 34 includes a split inner race having an inboard portion 36a and an outboard portion 36b, taper rollers 38, and a unitary outer race 40. The rotating element taper rolling bearing 34 is retained on the axle 12 by a nut 32 threadedly mounted to the outboard end of the axle 12. The nut 32 is screwed on to the outboard end of the axle 12, and a predetermined amount of torque is applied thereto to set the amount of radial compression load applied to the taper rollers 38.

Movement of the hub 22 relative to the rotating element taper rolling bearing 34 in the outboard direction is restricted by a radially inwardly directed lip 42 provided on the inboard end of the hub 22 that engages with the inboard face of the outer race 40. This prevents removal of the hub 22 from the axle 12 without the nut 32 and the rotating element taper rolling bearing 34 also being removed. This significantly increases the disassembly time and in particular significantly increases the re-assembly time due to the care with which the nut 32 must be secured to the axle 12 in order to retain the rotating element taper rolling bearing 34 with the required compression load. Movement of the hub 22 in the inboard direction is prevented by the drive shaft end plate 16 cooperating with a spacer 33.

Figure 2:
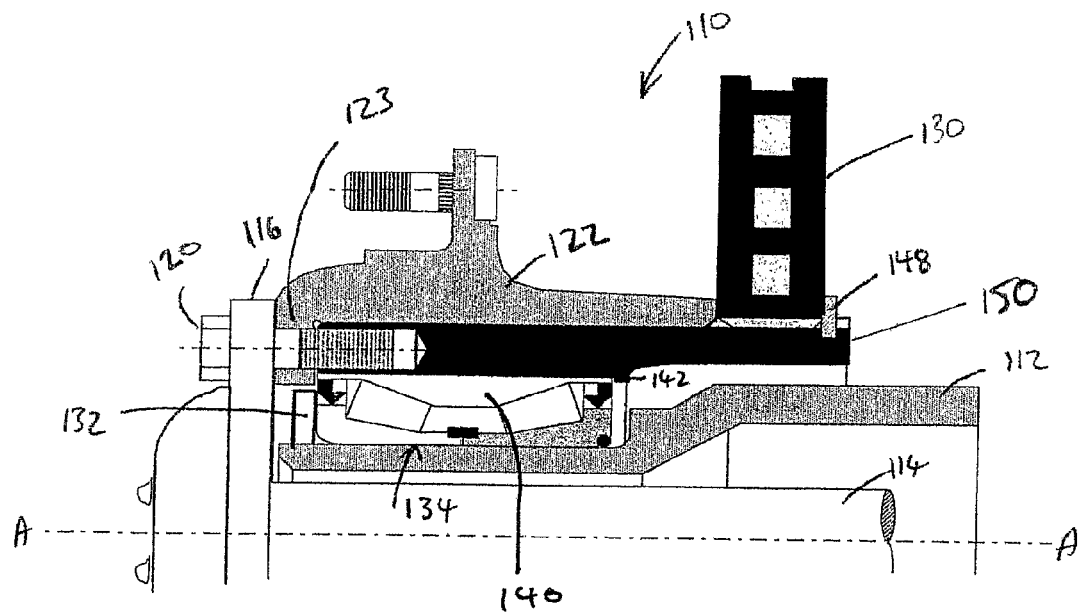
FIG. 2 is a cross-sectional view through the rotational axis of a hub assembly according to a first embodiment of the present invention.

FIG. 2 illustrates a hub assembly 110 according to a first embodiment of the present invention, and like numerals denote like parts with the addition of the prefix '1'. The only differences between the assembly of FIG. 2 with respect to FIG. 1 are discussed in detail below.

An additional bearing sleeve 150 is mounted intermediate the bearing 134 and the hub 122 to form part of the hub assembly 110. Outboard movement of the bearing sleeve 150 relative to the bearing 134 is restricted by the inwardly directed lip 142. The brake disc 130 is splined on to the inboard end of the bearing sleeve 150 and is restrained from inboard movement by a circlip 148 or other suitable means. In alternative embodiments, suitable alternative means of preventing relative rotation between the hub 122 and the brake disc 130 may be provided.

The hub 122 is retained in position by a plurality of bolts 120 arranged around the periphery of the drive shaft head (or flange) 116 that are screwed into a radially inwardly directed flange 123 of the hub 122 interposed between the drive shaft head 116 and the bearing sleeve 150, and therefore into corresponding threaded bores provided in the bearing sleeve 150. Inboard movement of the hub 122 relative to the bearing 134 is restricted due to engagement of the radially inwardly directed flange 123 with the outboard end of the bearing outer race 140. The inboard end of the hub 122 abuts the brake disc 130 to substantially prevent outboard movement of the brake disc 130.

By unscrewing the plurality of bolts 120 and removing the drive shaft head 116 and the drive shaft 114, the hub 122 and the brake disc 130 can be slid in an outboard direction off the bearing sleeve 150 with the nut 132 and the bearing 134 remaining in place. The process can then simply be reversed to permit re-assembly again without interfering with either the bearing 134 or the nut 132.

Figure 3:
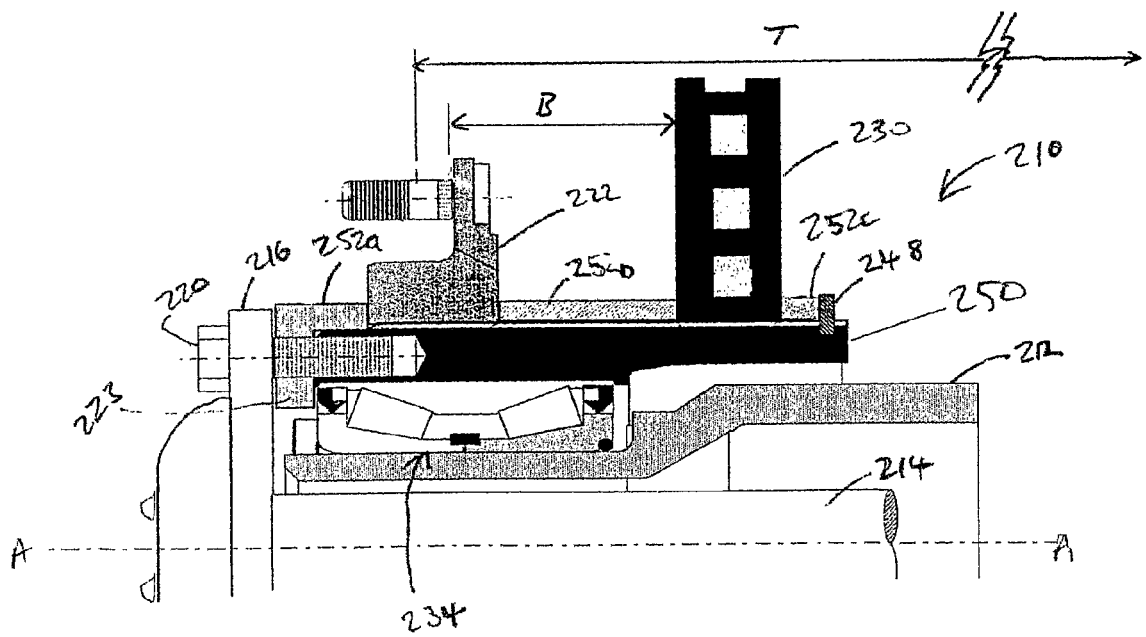
FIG. 3 is a cross-sectional view through the rotational axis of a hub assembly according to a second embodiment of the present invention.

FIG. 3 illustrates a second embodiment of the present invention where like numerals have been used for like parts with the addition of the prefix '2'. Thus, only those differences of the embodiment of FIG. 3 with respect to FIG. 2 are described in greater detail.

The width of the hub 222 is substantially reduced, and a separate hub retainer 252a and separate spacer rings 252b and 252c are provided to maintain the relative positions of the hub 222 and the brake disc 230, as well as the position of the hub 222 and the brake disc 230 relative to the axle 212. The hub retainer 252a is provided with an inwardly directed flange 223 with bores through which bolts 220 may be inserted. The hub retainer 252a prevents movement of the hub 222 in an outboard direction directly. The hub retainer 252a indirectly prevents movement of the brake disc 230 in an outboard direction due to the hub 222 and the spacer 252b that are positioned therebetween, as can be seen in FIG. 3. The circlip 248 or other suitable feature directly prevents movement of the spacer 252c in an inboard direction. The circlip 248 or other suitable feature indirectly prevents movement of the brake disc 230 in an inboard direction due to the spacer 252c that is positioned therebetween. The circlip 248 or other suitable feature indirectly prevents movement of the hub 222 in an inboard direction due to the spacer 252b, the brake disc 230 and the spacer 252c that are positioned therebetween, as can be seen in FIG. 3. A component can directly prevent movement of another component when the component contacts the another component. A component can indirectly prevent movement of another component if there is no contact between the component and the another component. All of these relationships are shown in FIG. 3. Both the offset B between the brake disc 230 and the hub 222 may be adjusted, as can the overall axle track T between corresponding wheels at either end of the same axle 212. To prevent relative rotational movement between the brake disc 230 and the hub 222, both the brake disc 230 and the hub 222 are in this embodiment splined onto the sleeve 250.

Referring to a third embodiment of the present invention as illustrated in FIG. 4, again, like numerals have been used for like parts, but with the addition of the prefix '3'.

The third embodiment corresponds largely to the first embodiment of FIG. 2 except that no separate bearing sleeve 150 is provided. Instead, the outer race 340 of the bearing 334 is enlarged to carry the brake disc 330, the hub 322 and the circlip 348. The outer race 340 is further provided with threaded bores in which the bolts 320 may be directly secured. One advantage of this embodiment is that the axial position of the brake disc 330 is more easily controlled since there are fewer components on which tolerance errors in the axial direction may arise.

Figure 5:
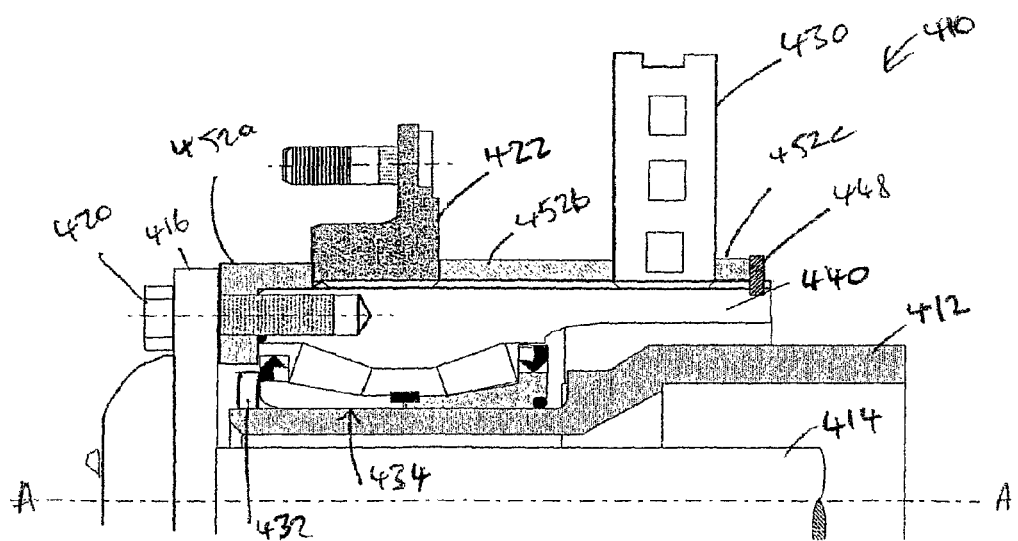
FIG. 5 is a cross-sectional view through the rotational axis of a hub assembly according to a fourth embodiment of the present invention.

A fourth embodiment of the present invention is shown in FIG. 5, where like numerals have been used for like parts with the addition of the prefix '4'.

This embodiment is similar to the second embodiment of the present invention, except that the separate sleeve 250 is dispensed with, and the outer race 440 of the bearing 434 is enlarged to carry the brake disc 430, the hub 422, the circlip 448, the hub retainer 452a, and the spacers 452b and 452c. As in the second embodiment, both the brake offset and the axle track may be adjusted by using the retainer 452a and the spacers 452b and 452c having differing axial lengths.

Figure 4:
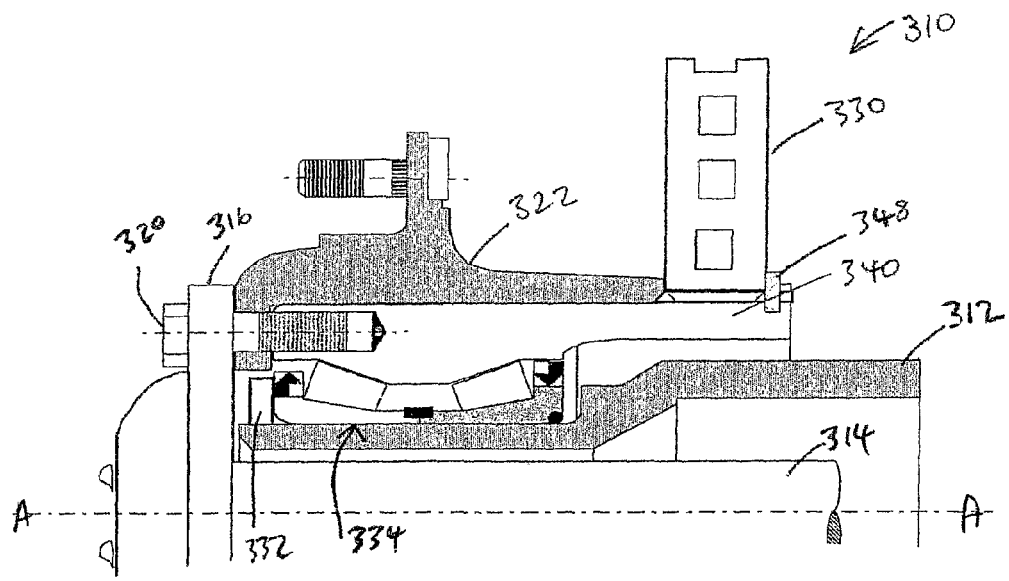
FIG. 4 is a cross-sectional view through the rotational axis of a hub assembly according to a third embodiment of the present invention.

Advantageously, the bearing sleeves 150 and 250 of FIGS. 2 and 3, respectively, are manufactured from lower cost steel that reduces overall materials cost of the assemblies shown in FIGS. 2 and 3 compared with the assemblies shown in FIGS. 4 and 5. The assemblies of FIGS. 4 and 5 by contrast include fewer components and are therefore easier to assemble than those of the FIGS. 2 and 3.

In the second, third and fourth embodiments of the present invention, both the hub and brake disc may be removed without also removing the bearing in a similar manner to the first embodiment.

It should be understood that numerous changes may be made within the scope of the present invention. For example, the assemblies may be adapted for use with non-driven axles in which the drive shaft is omitted and unbraked axles in which the brake disc is omitted. The assemblies may also be adapted for use with other braking types, such as drum brakes in particular. If the end plate is omitted, inboard movement of the hub may be prevented in those embodiments including a sleeve by ensuring that a lip on the sleeve, the hub, or the hub retainer engages the bearing outer race in the radially inward direction or by providing an end cover. It should be appreciated that the invention is not limited to use in conjunction with split race bearings. In particular, the bearing outer race associated with the outboard set of rotating elements need not be unitary with the bearing outer race associated with the inboard set of rotating elements, i.e. two single row rotation element bearings could be used. Furthermore, the brake disc may be non-rotatably secured directly on to the hub using a spline connection or the like rather than on to the bearing outer race or the sleeve.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specially described. For that reason the following claims should be studied to determine the true scope and content of this invention.

What is claimed is:

1. A wheel hub assembly for fitment to a wheel bearing assembly, the wheel bearing assembly being mounted on a vehicle axle, the wheel hub assembly comprising:
   a hub;
   a bearing sleeve mounted radially intermediate a wheel bearing assembly and the hub; and
   a brake disc mountable on the bearing sleeve and rotatable relative to a vehicle axle, wherein the brake disc is slidable relative to the bearing sleeve, an offset spacing of the brake disc with respect to the hub is adjustable, the hub and the brake disc are removable without removing the wheel bearing assembly, the brake disc is slidable on the bearing sleeve, and wherein the brake disc is splined on the bearing sleeve.

2. The wheel hub assembly according to claim 1 wherein the bearing sleeve includes an abutment to restrict inboard movement of the hub.

3. A wheel hub assembly for fitment to a wheel bearing assembly, the wheel bearing assembly being mounted on a vehicle axle, the wheel hub assembly comprising:
   a hub;
   a bearing sleeve mounted radially intermediate a wheel bearing assembly and the hub; and
   a brake disc mountable on the bearing sleeve and rotatable relative to a vehicle axle, wherein the brake disc is slidable relative to the bearing sleeve, an offset spacing of the brake disc with respect to the hub is adjustable, the hub and the brake disc are removable without removing the wheel bearing assembly, the brake disc is slidable on the bearing sleeve, the bearing sleeve includes an abutment to restrict inboard movement of the hub, and wherein the abutment includes a circlip.

4. The wheel hub assembly according to claim 2 wherein the abutment indirectly restricts inboard movement of the hub.

5. The wheel hub assembly according to claim 1 wherein the hub is retained by a plurality of fasteners.

6. A wheel hub assembly for fitment to a wheel bearing assembly, the wheel bearing assembly being mounted on a vehicle axle, the wheel hub assembly comprising:
   a hub;
   a bearing sleeve mounted radially intermediate a wheel bearing assembly and the hub; and
   a brake disc mountable on the bearing sleeve and rotatable relative to a vehicle axle, wherein the brake disc is slidable relative to the bearing sleeve, an offset spacing of the brake disc with respect to the hub is adjustable, the hub and the brake disc are removable without removing the wheel bearing assembly, the brake disc is slidable on the bearing sleeve, the hub is retained by a plurality of fasteners, and wherein the plurality of fasteners are threaded into a flange of the hub.

7. The wheel hub assembly according to claim 6 wherein inboard movement of the hub relative to the bearing sleeve is restricted by engagement of the flange with an outer race.

8. The wheel hub assembly according to claim 1 wherein the hub abuts the brake disc to prevent outboard movement of the brake disc.

9. The wheel hub assembly according to claim 1 wherein the wheel bearing assembly includes a rotating element taper roller bearing.

10. A wheel hub assembly for fitment to a wheel bearing assembly, the wheel bearing assembly being mounted on a vehicle axle, the wheel hub assembly comprising:
    a hub;
    a bearing sleeve mounted radial intermediate a wheel bearing assembly and the hub; and
    a brake disc mountable on the bearing sleeve and rotatable relative to a vehicle axle, wherein the brake disc is slidable relative to the bearing sleeve, an offset spacing of the brake disc with respect to the hub is adjustable, the hub and the brake disc are removable without removing the wheel bearing assembly, and the brake disc is slidable on the bearing sleeve, the wheel bearing assembly includes a rotating element taper roller bearing, and wherein the wheel bearing assembly comprises a unitary outer race.

11. The wheel hub assembly according to claim 9 wherein the wheel bearing assembly comprises a split inner race.

12. The wheel hub assembly according to claim 1 wherein the hub is not connected to a drive shaft.

* * * * *